United States Patent [19]

Nagata

[11] Patent Number: 5,005,894
[45] Date of Patent: Apr. 9, 1991

[54] AUTOMOTIVE SEAT WITH SUSPENSION DEVICE

[75] Inventor: Kojiro Nagata, Akishima, Japan

[73] Assignee: Tachi S Co., Ltd., Tokyo, Japan

[21] Appl. No.: 429,512

[22] Filed: Oct. 31, 1989

[51] Int. Cl.⁵ .............................................. B60N 2/42
[52] U.S. Cl. .................................. 296/68.1; 297/216; 297/345; 248/421
[58] Field of Search ............... 296/68.1; 297/216, 345, 297/470; 248/421, 422, 423

[56] References Cited

U.S. PATENT DOCUMENTS

| | | | |
|---|---|---|---|
| 3,811,727 | 5/1974 | Rumpel | 297/216 X |
| 3,957,304 | 5/1976 | Koutsky et al. | 297/216 X |
| 3,977,725 | 8/1976 | Tengler et al. | 297/216 X |
| 4,813,645 | 3/1989 | Iwami | 248/588 |

*Primary Examiner*—Dennis H. Pedder
*Assistant Examiner*—Andrew C. Pike

*Attorney, Agent, or Firm*—Browdy and Neimark

[57] ABSTRACT

An automotive seat with a suspension device has an X-shaped link mounted between an upper seat frame and lower floor frame. The X-shaped link is equipped with a seat belt anchor and a sublink link slideably connected between one of the link members of the X-shaped links and the lower floor frame. The sublink has an elongated hole at one of its ends which is slideably engaged to a pin on one of the link members of the X-shaped links. The other end of the sublink is pivotally connected to the lower floor frame. When a force is exerted on the seat belt anchor, it is transmitted through the sublink directly to the floor, thereby preventing damage or deformation of the suspension device. Further, when the suspension is contracted, the X-shaped link and the sublink are hidden behind the upper and the lower frames thereby creating a suspension device with a very low profile.

3 Claims, 1 Drawing Sheet

5,005,894

AUTOMOTIVE SEAT WITH SUSPENSION DEVICE

BACKGROUND OF THE INVENTION

1. Field of the Invention

The present invention relates to a vehicle seat with a suspension device, and particularly is concerned with a structure of the suspension device in the seat equipped with a set belt anchor.

2. Description of the Prior Art

In some of vehicles, especially automobiles, a suspension device is provided between the seat and floor for the purpose of resiliently supporting the seat to absorb a vibration or shock caused during driving on a rough road.

In most instances, a suspension device of this kind has X-shaped links are provided between an upper frame connected to a seat and a lower frame fixed on the side of floor of automobile body such that the upper frame is vertically movable via the X-shaped links relative to the lower frame, and a spring is extended between the X-shaped links and those frames, with a shock absorber being interposed between the upper and lower frames, whereby with this structure, the suspension action is performed by virtue of the spring and shock absorber.

The seat provided with such suspension device has created problems in anchoring seat belts anchor thereon, in that the structure of the belt anchors involve a high possibility, that a great impact will cause damage to the suspension device and excessive pressure through the seat belt on the occupant. For example, when the belt anchor is fixed on the seat or the upper frame of the suspension device, an accidental collision accident may result in the occupant being thrown out of the automobile. On the other hand, in the case of the belt anchor fixed on the floor, the vertical movement of the suspension device, even in driving on a normal road, causes undesired excessive fastening of the seat belt around the occupant.

In view of the foregoing problem, there has been proposed a dual belt anchor structure consisting of a first belt anchor fixed on the set or the upper frame of suspension device and a second belt anchor fixed on the side of vehicle floor, wherein the first belt anchor is connected with the second belt anchor via a second belt or link, so that, in a collision accident, a reaction force exerted by the occupant to the seat belt is transmitted and passed to the floor.

However, the above-mentioned dual belt anchor structure employed in conventional seat with suspension device is found disadvantageous in its complexity due to the fact that the two belt anchors as well as the second belt or link are required for installation of a seat belt on the seat, and further has a shortcoming in that the second belt needs to be adjusted its length so as to be loosened, considering the stroke amount of vertical movement of the suspension device as well as the movement range of slide rails, and the degree of loosening of the second belt varies depending on different forward-/backward positions of the seat adjusted by the occupant, which makes the occupant feel uneasy about the unstable state of seat belt and hard to trust the seat belt in sitting on the seat.

To solve the above-mentioned problems, the the inventor of the present invention has proposed an improvement in the seat with suspension device which is now issued under the U.S. Pat. No. 4,813,645 according to which, in its X-shaped link type suspension device, there is provided halfway engagement means at the upper frame thereof and a slidable engagement link means is provided between the halfway engagement means and and the lower frame of the suspension device, which lower frame is fixed upon the floor of the automobile. To be little more specific in this respect, laterally of the seat cushion, a base plate is provided, which is formed with a seat belt anchor and a U-shaped stopper member, and further a guide bracket is provided, which has an inverted U-shaped guide flange which is in a halfway engagement with the U-shaped stopper member, thus forming the halfway engagement means. The guide bracket is at its lower side formed with a horizontally elongated slide engagement hole. At the lower frame, a connecting link is rotatably provided, extending upwardly and its upper end portion is slideably engaged in the slide engagement hole of the slideably engagement means, thus forming the slideably engagement link means. The advantage of suspension device, as well as the provision of the the halfway engagement means and the link means between the upper and lower frames, creates an interference against the lowest lowering of the upper frame towards the lower frame, resulting in the difficulty of designing the lowest lowering level of the suspension device which is a hindrance in the design of the same to adapt itself to the one which permits a tall occupant to be seated on the seat cushion within a small-size automobile.

SUMMARY OF THE INVENTION

It is a first purpose of the present invention to provide an improved automotive seat with a suspension device which is free from a mechanical damage or failure due to a great pulling force exerted on seat belt anchor provided therein, with a simple construction.

In attaining the purpose, in accordance with the present invention, a sublink is provided between a link member of an X-shaped links and a floor of automobile body. The sublink serves to limit an undesired further upward movement of the X-shaped links which might cause a deformation or damage to the links themselves. Thus, the structure of the suspension device is much simplified and ensures to avoid damage thereof.

It is a second purpose of the invention to render lower the level of the seat cushion to enable a tall occupant to sit on the seat in a small-size automobile.

To this end, the sublink is at its upper area formed with an elongated hole and at its lower end pivotally connected at the side of the floor, and through such elongated hole, is slidably inserted a pin which is provided at a link member of the X-shaped links such as to be disposed between the upper connected point of the link member and the crossed point of the X-shaped links. Thus, the sublink per se is not interfered with the vertical movements of X-shaped links, allowing it to be lowered at a lowest possible level by setting the lower edge of the elongated hole of the sublink accordingly, which lower edge limits the lowering of the X-shaped links.

It is a third purpose of the invention to transmit the pulling force through the seat belt anchor to the floor directly, to thereby prevent damage or deformation of the elements of the suspension device.

To this end, the sublink is so arranged that it is tilted in parallel relation with the seat belt anchor, when the pulling force is applied to the seat belt anchor. Such same direction in which both seat belt anchor and sublink are oriented is effective in allowing the force to be transmitted therethrough directly to the floor, without giving damage to other surrounding elements of the suspension device.

DETAILED DESCRIPTION OF PREFERRED EMBODIMENT OF THE INVENTION

Figure 1:
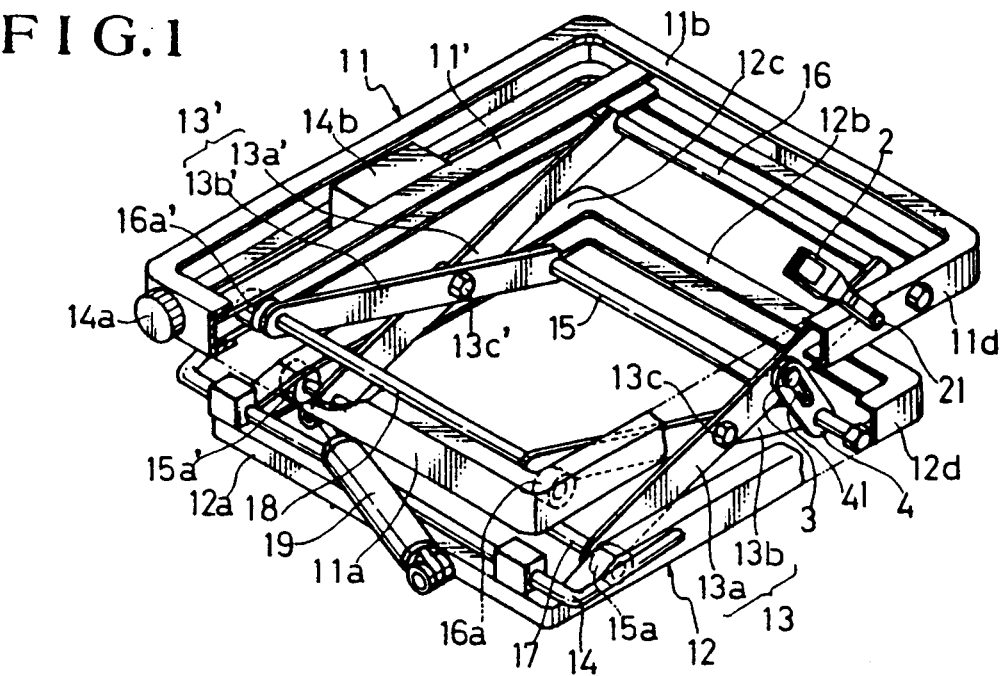
FIG. 1 is a partially broken perspective view of a suspension device in accordance with the present invention.
Figure 2:
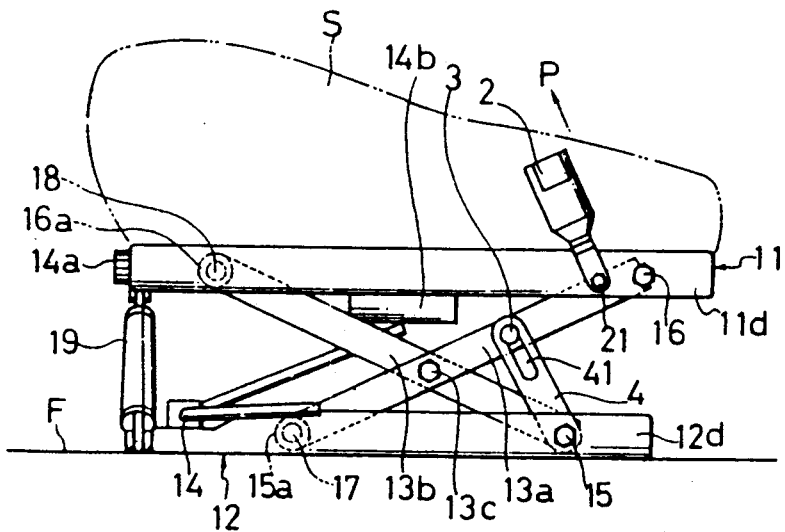
FIG. 2 is a side view of a seat with the suspension device, showing the state wherein a great pulling force is applied thereto.
Figure 3:
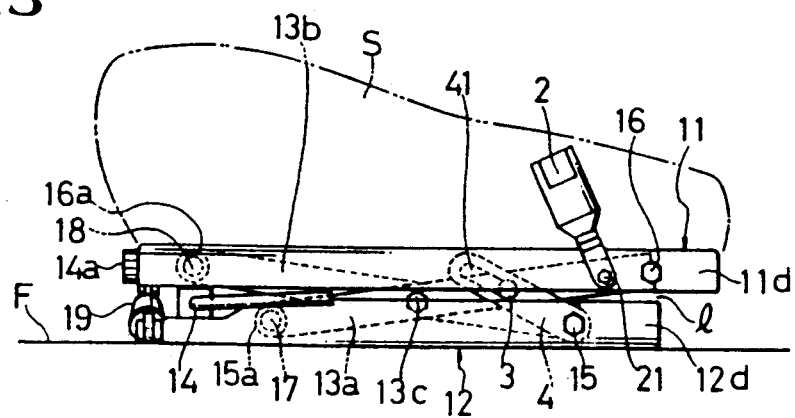
FIG. 3 is a side view of the same seat, which shows the state wherein the seat is lowered to a lowest level.

Referring to FIGS. 1 through 3, there is shown a seat suspension device for use in an automotive seat in accordance with the present invention. As understandable from FIG. 2, a seat cushion (S) is mounted on an upper frame (11) of the suspension device.

The illustrated seat suspension device is of an X-shaped-link type wherein there are interposed a pair of X-shaped links (13)(13') between upper and lower frames (11)(12) in a vertically expandable/contractable manner and the X-shaped links (13)(13') are given a certain resilient upward supportive force by means of a torsion bar (14) which is adjustable in repercussive force against a downward load so as to provide a proper cushiony effect on the suspension device according to the weight of an occupant on the seat cushion (S). The lower frame (12) is fixed upon the floor (F) of an automobile (not shown). Forwardly of and between the upper and lower frames (11)(12), is provided a shock absorber (19). The repercussive force of the torsion bar (14) is adjusted by means of an weight adjustment mechanism (14a)(14b).

In brief, the specific construction of the X-shaped links (13)(13') and the associated upper and lower frames (11)(12) is such that both upper and lower frames (11)(12) are formed in a channel cross-section, defining opened recesses therein which faces inwardly of the frames, the upper frame (11) having an auxiliary side frame (11') extended between its forward and rearward frame sections (11a)(11b) in parallel with the left-side lateral frame section (11d), with the width between the auxiliary side frame (11') and left-side lateral frame section (11d) being generally same with the length of both forward and rearward frame sections (12a)(12b) of the lower frame (12), and that the X-shaped links (13)(13') comprises first link members (13a)(13a') and second link members (13b)(13b'), respectively, both first and second link members being crossed and pivoted at (13c)(13c'), such that both lower forward ends of the first link members (13a)(13a') are connected with a lower forward rod (17) which is movable along both lateral frame sections (12c)(12d) of the lower frame (12) via rollers (15a)(15a'), whereas both upper rearward ends of the same (13a)(13a') are connected with an upper rearward rod (16) which is provided stationary rearwardly of the upper frame (11), and both upper forward ends of the second link members (13b)(13b') are connected with an upper forward rod (18) which is movable along the auxiliary side frame (11') and lateral frame section (11d) via rollers (16a)(16a'), whereas both lower rearward ends of the same (13b)(13b') are connected with a lower rearward rod (15) is provided stationary rearwardly of the lower frame (12). The rollers (15a)(15a') (16a) (16a') are fitted in the opened recesses of the relevant lateral frame sections of the upper and lower frames (11)(12), in a maner being rollable therealong, as shown. In this context, it should be understood that the forward frame sections (11a)(12a) are oriented in a direction forwardly of the automotive seat in which the seat suspension device is used, thus facing in a direction wherein the automobile runs along, whereas by contrast, the rearward frame sections (11b)(12b) are oriented rearwardly of the seat and thus towards the rear side of the automobile. Therefore, the X-shaped links (13)(13') are disposed substantially in alignment with such running direction wherein the automobile runs along.

A seat belt anchor (2) is pivotally fixed on the rearward end part of the lateral frame section (11d) of the upper frame (11) by means of a pin (21) in the vicinity of the upper rearward rod (16).

Designation (4) represents a sublink whose lower end portion is rotatably connected with the lower rearward rod (15). The sublink (4) is formed with an elongated hole (41) at its upper area, in which elongated hole (41), is slidably fitted a pin (3) which is fixed midway on the upper half link area of the first link member (13a). In other words, the location of the pin (3) is preferably set at the midway point between the pivot (13) and axis of the upper rearward rod (16), and then, the elongated hole (41) of the sublink (4) is slidably engaged with the pin (3). Hence, with the vertical movements of the upper frame (11) relative to the lower frame (12), the pin (3) is slidingly moved in the likwise direction along the elongated hole (41) of the sublink (4).

The entire length of the sublink (4) and that of the elongated hole (41) should be determined so that, when the upper frame (11) is raised up to a maximum high level by a pulling force (P) exerted on the seat belt anchor (2), in a collision accident, the pin (3) is limited its upward slide movement by the upper edge of the hole (41), so as to prevent a further raising of the upper frame (11) which might damage the X-shaped links (13) or other associated elements of the suspension device, and that the lowest level at which the upper frame (11) is allowed to be lowered against the lower frame (12) is limited by the lower edge of the hole (41), providing a small clearance (l) between the upper and lower frames (11)(12), as can be understood from FIGS. 2 and 3.

As in FIG. 2, when the upper frame (11) is raised to a maximum high level, the sublink (4) is tilted at a proper angle relative to the horizontal line on the floor (F) such as to be in a parallel relation with the inclination angle of the seat belt anchor (2) which is assumed when it is exerted the great pulling force (P). Preferably, in such case, the sublink (4) assumes such a tilted angle as to extend perpendicularly towards the first link member (13a). The longitudinal direction of the sublink (4) intersects of the first link member (13a), whereby the pulling force (P) is completely received by the sublink (4).

Accordingly, in practice, in the event of a collision accident, acting upon an occupant on the seat to throw him or her forwardly, causing a great pulling force (P) upon a seat belt (not shown) on the occupant, then the seat belt anchor (2) is exerted such pulling force (P), as shown in FIG. 2, and the upper frame (11) is thereby forced upwardly away from the lower frame (12), expanding the X-shaped links (13)(13') upwardly. Then, the pin (3) on the first link member (13a) of the X-shaped links (13) is moved upwardly along the elongated hole (41) of the sublink (4) and prevented its further upward movement at the upper edge of the elongated hole (41). Thus, the upper frame (11) is limited its further upward movement and the pulling force (P) is transmitted through the first link member (13a) and sublink (4) to the lower frame (12) or the floor (F) of automobile body, whereupon the pulling force (P) is completely escaped to and recieved by the floor (F), without giving its force to other elements of the suspension device such pulling force (P), and damaging them.

Further, as shown in FIG. 3, the upper frame (11) can be lowered at a lowest possible level but limited with respect to the lower frame (12), by a small clearance (l), by virtue of the above-described structure of the sublink (4).

From the above descriptions, it is to be seen that simply providing such sublink (4) on the X-shaped links (13)(13') permits dispersion of the great pulling force (P) to the floor (F), protecting the mechanical elements of the suspension device, which presents a far more simple reinforcing or protecting means for the suspension device, without requiring a complicated mechanical systems. Additionally, the entire length of the sublink (4), because of its being extended between the link member and lower frame (12), is so short as to avoid its interference with the X-shaped links (13)(13') when the latter is contracted downwardly, with the upper frame (11) coming close to the lower one. Due to that, the seat cushion (S) can be lowered to much lower level than that of the prior art, to thus permit installing of the suspension device in a small-size automobile, allowing easy entry of a tall occupant thereinto. Furthermore, the inclination of the sublink (4) which is assumed in parallel with the direction of the pulling force (P), in a collision accident, serves to avoid the damage and deformation of the sublink (4) and transmit the force (P) to the floor (F) directly, without giving any damage to the elements of the suspension device.

While having described the present invention as above, it should be understood that the invention is not limited to the illustrated embodiment, but any other modifications, replacements and additions may structurally be possible. For example, the seat belt anchor (2) may be provided on the frame of the seat cushion (S), and the lower pivot point of the sublink (4) may be disposed at the floor (F), or at the upper rail of a slide rail (not shown) which is used for adjustment of fore-and-aft position of the seat, or at the lower frame (12), instead of being disposed on the lower rearward rod (15). Further, the seat belt anchor (2) and sublink (4) may be provided on both lateral side of the suspension device.

What is claimed is:

1. An automotive seat with a suspension device having upper and lower frames, the seat including a seat cushion on the upper frame and the lower frame engaging a floor of an automobile body, said seat comprising:
    an X-shaped link means entirely interposed inwardly of the upper and lower frames;
    a first pivot connecting a first link member of said X-shaped link means to the upper frame;
    a second pivot connecting a second link member of said X-shaped link means to the lower frame;
    a seat belt anchor;
    a pin fixed on said first link midway between a cross point of said X-shaped link means and said first pivot; and
    a sublink positioned inwardly of the frames having one end connected to the lower frame by said second pivot and another end thereof formed with an elongated hole in which said pin is slideably retained.

2. The automotive seat according to claim 1, wherein said X-shaped link means further comprises:
    said first link member and said second link member pivotally connected in an adjustable cross at the cross point;
    said first link member pivotally connected at an upper end thereof to a rearward point of the upper frame and slideably connected at a lower end thereof to the lower frame;
    said second link member pivotally connected at a lower end thereof to the lower frame and slideably connected at an upper end thereof to a forward point of the upper frame; and
    said seat belt anchor provided adjacent to the seat and said upper end of said first link member;
    wherein said pin is provided on said first link member between said first pivot and the cross of said first and second link members.

3. The automotive seat according to claim 1, wherein said sublink is so arranged that a longitudinal axis thereof is parallel to a longitudinal axis of said seat belt anchor, when a force is exerted on said seat belt anchor that slides said pin upward as far as possible within said elongated hole.

* * * * *